United States Patent [19]

Paaskesen

[11] 3,789,749

[45] Feb. 5, 1974

[54] TOASTER

[76] Inventor: Julius Barclay Estrup Paaskesen, 17-19, Naverland, Glostrup, Denmark

[22] Filed: Aug. 24, 1972

[21] Appl. No.: 283,377

[52] U.S. Cl. .............................................. 99/391
[51] Int. Cl. .......................................... A47j 37/08
[58] Field of Search ... 99/329 R, 329 RT, 334, 335, 99/385, 389, 390, 391, 392, 393, 400, 340

[56] References Cited
UNITED STATES PATENTS

| | | | |
|---|---|---|---|
| 1,720,800 | 7/1929 | Morrison | 99/391 X |
| 1,888,992 | 11/1932 | Lofgren et al. | 99/391 X |
| 1,948,693 | 2/1934 | Beardsley | 99/329 RT UX |
| 1,948,739 | 2/1934 | Wolcott et al. | 99/335 X |

*Primary Examiner*—Harvey C. Hornsby
*Assistant Examiner*—Philip R. Coe
*Attorney, Agent, or Firm*—Kemon, Palmer & Estabrook

[57] ABSTRACT

A toaster in which a vertical toasting compartment is closed during a toasting operation by means of a movable bottom wall. After termination of the toasting operation the bottom wall is retracted so as to permit the toasted bread to be discharged from the compartment. The retraction of the bottom wall may be automatically controlled by a timing device and it may be effected by swinging the bottom wall downwardly on a horizontal pivot axis. The opposed side walls of the toasting compartment are movable in vertical direction and are coupled to the bottom wall in such a way that the side walls are lifted slightly when the bottom wall is retracted to its discharge position. A lost-motion coupling may be provided between the side and bottom walls so that the movement of the side walls is considerably smaller than that of the bottom wall and is effected in a jerky manner.

6 Claims, 6 Drawing Figures

TOASTER

BACKGROUND OF THE INVENTION

This invention relates to a toaster of the kind which comprises a housing and two apertured walls extending vertically opposite one another within the housing to define therebetween a vertical toasting compartment, heating means located on the opposite exterior sides of said walls, and a toasting compartment bottom wall movably supported within the housing between a first position in which it closes the lower end of the compartment and a second position in which it permits toasted bread to slide out through the bottom of the compartment.

Toasters of the kind referred to are known inter alia from U.S. Pat. No. 1,852,398 (issued Apr. 5, 1932 to M. Bersted) and from my own prior U.S. Pat. No. 3,636,858 (issued Jan. 25, 1972). These known toasters are provided with timing devices which may be manually set to determine the termination of a toasting period by releasing a pawl holding the bottom wall of the toasting compartment in its compartment closing position, following which the toasted bread may slide downwardly out through the lower end of the compartment. This partial automation of the toaster's function may be expedient in particular for toasting small buns or rollers as those often sold together with so-called hamburgers or frankfurters (hog dogs) because in such cases the toaster will most often be operated by the same person who is also engaged with selling the goods mentioned.

It has now been found that sometimes the toasted buns or rollers do not slide or drop out of the toasting compartment when the bottom plate is retracted, but remain therein, in particular if they are stacked rather compactly between the opposed side walls of the toasting compartments in which case they may stick or adhere to the side walls due to the heating to which they have been subjected.

SUMMARY OF THE INVENTION

According to the present invention there is provided a toaster, comprising a housing, two apertured walls extending vertically opposite one another within said housing to define therebetween a vertical toasting compartment, heating means located on the opposite exterior sides of said walls, a toasting compartment bottom wall movably supported within said housing between a first position in which it closes the lower end of said compartment, and a second position in which it permits toasted bread to slide out through the bottom of said compartment, wherein said vertical walls are supported for vertical movement within said housing, and a mechanism is provided which connects said vertical walls with said bottom wall so as to move said vertical walls upwardly when said bottom wall is retracted from its said first position to its said second position.

The positive or forced upward movement which is imparted to the opposed side walls of the toasting compartment simultaneously with the release and retraction of the compartment bottom wall, has proved to eliminate or at least reduce any adhesion between the toasted bread and any of the apertured compartment walls to such an extent that the bread is with certainty disengaged from the walls and slides downwardly and out through the compartment bottom, even if at the moment nobody is supervising the operation of the toaster.

Normally, a vertical travel of the compartment walls, which is relatively small as compared to the travel of the bottom wall, will be sufficient and desirable, and in order to obtain this, the mechanism may comprise a tie rod, means supporting said tie rod for vertical movement, means connecting said tie rod with said vertical walls, a coupling means on said bottom wall and a lost-motion coupling connecting said tie rod with said coupling means, the lost motion of said coupling being slightly smaller than the movement of said coupling means in response to the movement of said bottom wall between its said first and second positions.

A preferred embodiment of the toaster according to the invention will now be described in more detail with reference to the partially diagrammatical, accompanying drawings.

DETAILED DESCRIPTION

Figure 5:
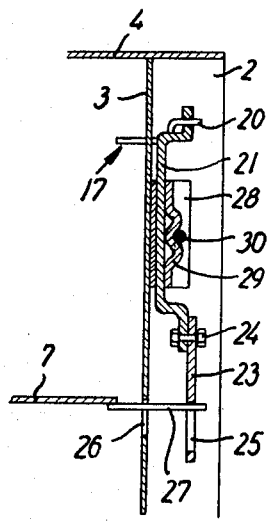
FIG. 5 is a section taken along line V—V in FIG. 3.

The toaster illustrated in the drawings which generally may be constructed as shown in my U.S. Pat. No. 3,636,858, referred to above, has a housing with a front wall 1, a rear wall 2, two end walls 3, of which only one is shown, and a top wall 4. As seen in FIG. 5, the end wall 3 is slightly retracted so that there is room between wall 3 and an end cover (not shown) for the actuating mechanism described below, which moves the opposed lateral walls of the toasting compartment up and down.

Figure 1:
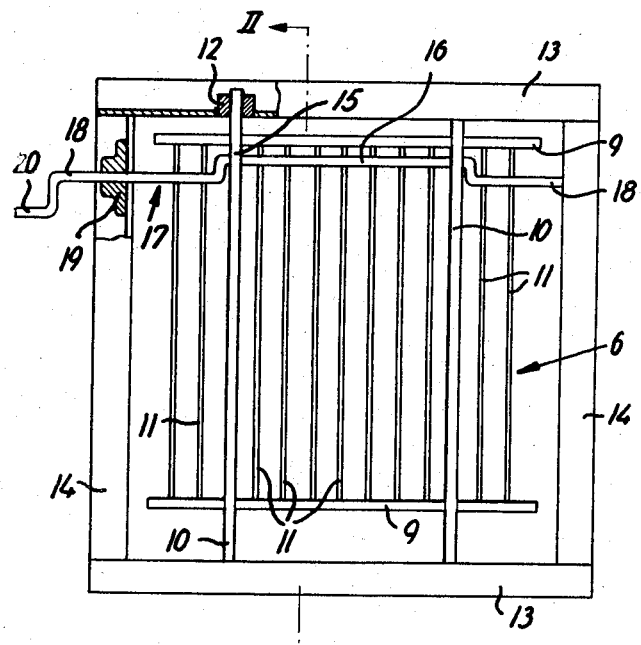
FIG. 1 is an elevation, partially in section, of an insert comprising a vertically displaceable grid wall and a part of the associated actuating mechanism for insertion in the toaster.
Figure 6:
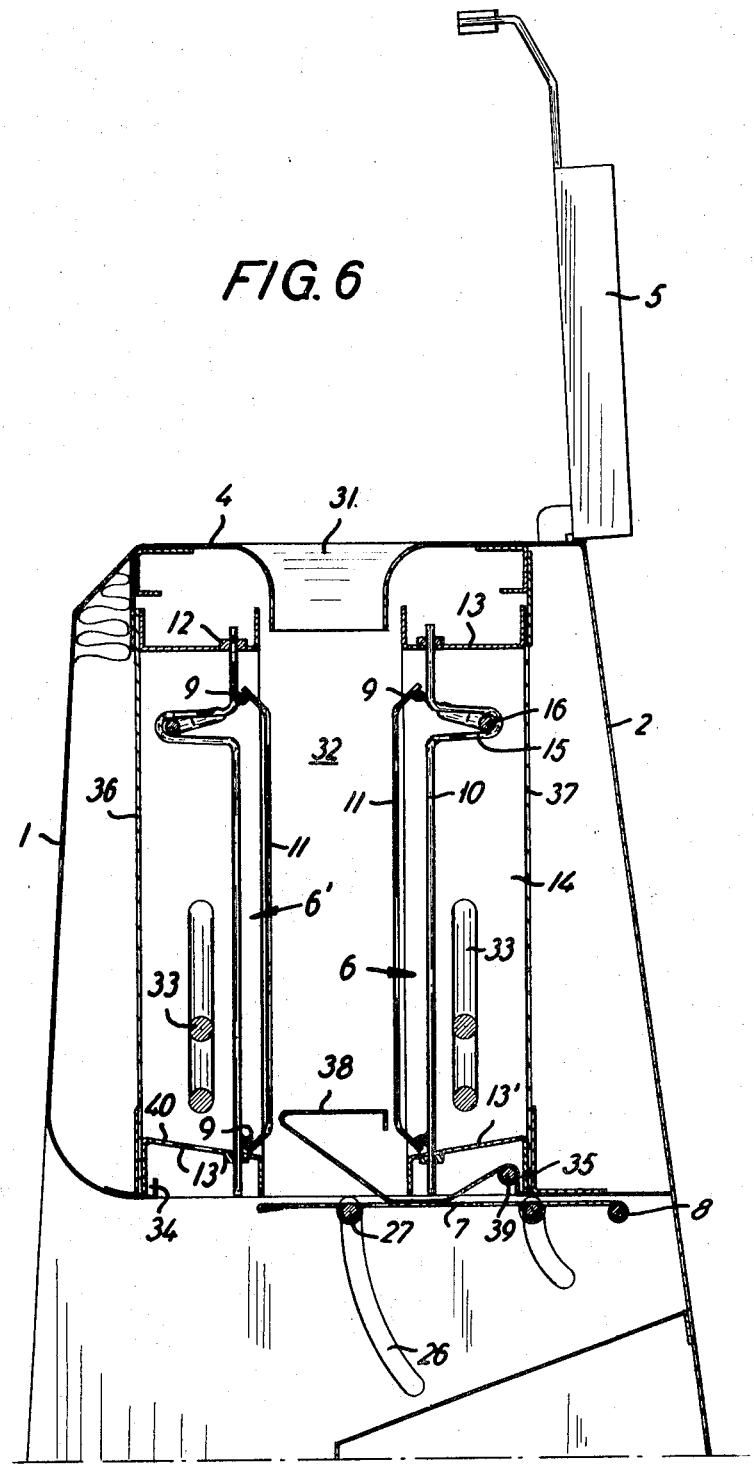
FIG. 6 is a vertical section through the toaster showing further details thereof, the figure being drawn approximately to the same sale as FIGS. 1 and 2.

In top wall 4 there is an aperture 31 which, during the operation of the toaster, is closed by a cover 5 hingedly connected with the top wall so as to enable it to be swung up as shown in FIG. 6 to give access to the toasting or bread compartment 32 of the toaster located below aperture 31. As described in my U.S. Pat. No. 3,636,858 which is herewith incorporated by reference, the toasting compartment is defined in the lateral direction by two vertical grid walls 6 and 6' spaced from walls 1 and 2. Wall 6 is shown more detailed in FIGS. 1 and 2, and heating elements, e.g., electric heating coils 33, are located between the two grid walls and walls 1 and 2.

In a like manner as described in U.S. Pat. No. 3,636,858 during operation of the toaster, the bottom of the toasting compartment is closed by means of a bottom plate 7 pivotally supported by a hinge pin 8 in the proximity of rear wall 2 so that the bread, such as rolls or buns present in the toasting compartment, once the toasting operation is terminated, may slide downwardly and out through an aperture (not shown) in front wall 1. As described in said patent, cover 5 may be coupled to bottom plate 7 by means of a mechanism (not shown) that effects the raising of the bottom plate when cover 5 is lifted for inserting a fresh portion of bread into the bread compartment, subsequent to which the bottom plate is locked by a pawl that can be tripped by a timing device which is started when cover 5 is reclosed.

Each of the two grid walls 6 and 6' which are mirror images of one another comprises two relatively heavy horizontal rods or bars 9 which are interconnected by means of two vertical rods 10 and a plurality of thinner, vertical rods 11. The two vertical rods 10 are, at the top and at the bottom, guided in supporting sleeves 12 secured to two horizontal channels 13 and 13', which, in conjunction with two vertical bars 14, form a frame which may be mounted in the toaster housing as shown in FIG. 6.

Figure 2:
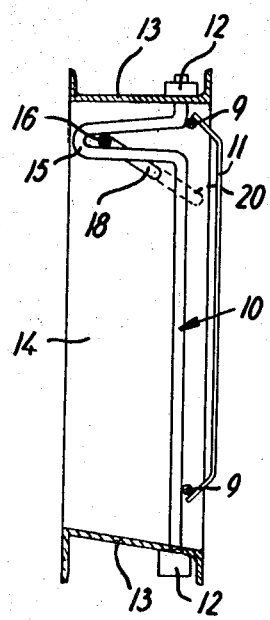
FIG. 2 is a section taken along line II—II in FIG. 1.

As appears from FIGS. 2 and 6, each of the vertical rods 10 is offset between its extremities so as to form a horizontally projecting bight 15 with which the cranked centre section 16 of a horizontally extending crankshaft 17 engages. The coaxial end portions 18 of crankshaft 17 are journalled in two supporting sleeves 19 secured to the vertical bars 14 of the frame. Outside the left-hand bar 14 in FIG. 1, shaft 17 is additionally cranked to form an open crank throw 20. It will be seen that when crankshaft 17 pivots on its longitudinal axis defined by the journal portions 18, the associated grid wall 6 or 6' is raised or lowered relative to the stationary frame 13, 14 of the toaster.

Figure 3:
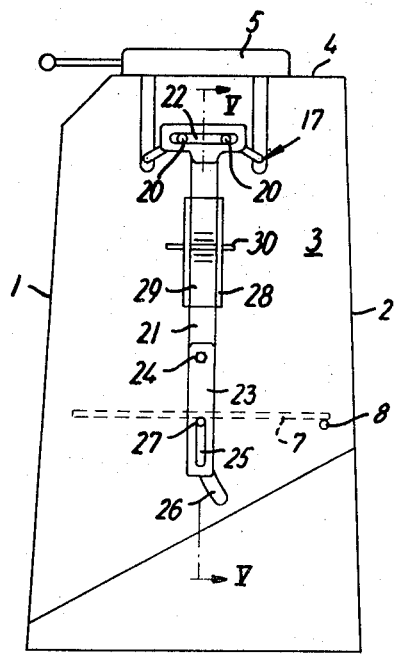
FIG. 3 is an end view on a reduced scale of the toaster incorporating two grid walls as shown in FIGS. 1 and 2, showing primarily the remainder of the actuating mechanism for the two grid walls.
Figure 4:
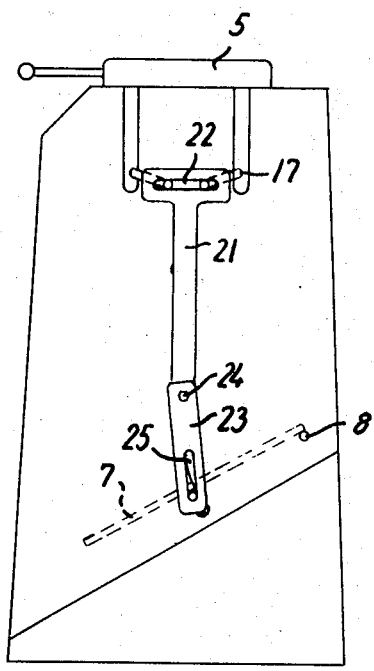
FIG. 4 is a view corresponding to FIG. 3 with the mechanism in a different position.

Said pivoting of crankshaft 17 may be effected by means of the mechanism shown in FIGS. 3–5, which is mounted outside one of the end walls 3 of the toaster. The mechanism comprises a vertical tie rod 21, which, at its top end, has a transverse head with a horizontal slot 22, in which the crank throws 20 of the two grid walls engage. At its bottom end, tie rod 21 is pivotally connected with a link 23 by means of a bolt 24. Link 23 has an oblong slot 25 in which a pin 27 engages. The pin 27 is secured to the pivotal bottom plate 7 and projects through an arcuate slot 26 in end wall 3. The centre of slot 26 coincides with the centre of pivot pin 8 of the bottom plate.

Tie rod 21 is guided for vertical movement by means of a channel-shaped guide 28 secured to wall 3, and the tie rod is held in contact with the bottom of guide 28 by means of a corrugated pressure plate 29 located by means of a cotter pin 30 inserted through the legs of guide 28. For the sake of clearness, the guide means for tie rod 21 is not shown in FIG. 4.

When bottom plate 7 assumes its top position shown in FIGS. 3 and 6, that is to say when the toaster is in operation, pin 27 engages with the top end of slot 25 and, consequently, tie rod 21 is in its top position while the two grid walls 6 and 6' are in their bottom position as the two crank throws 16 and 20 are offset in opposite directions from the centre line of crankshaft 17. When bottom plate 7 swings down as described above, that is to say into the position shown in FIG. 4, pin 27 comes to engage with the bottom end of slot 25 since the length of this slot is somewhat inferior to the maximum movement of the pin. Link 23 and tie rod 21 are consequently pulled down into their bottom position, that is to say that the two grid walls 6 and 6' are raised a corresponding distance concurrently with the release of the bread present in the toasting compartment. If the bread adheres to any of the grid walls, it will be shaken loose from the grid walls in response to the raising movement of the walls and it will then be able to slide unimpededly out of compartment 32 as mentioned above. When bottom plate 7 is raised again before the next toasting operation, tie rod 21 is returned to the position shown in FIG. 3, and grid walls 6 and 6' are lowered into the normal operating position.

Since the raising of the toasting compartment walls 6 and 6' is effected only at the end of the downward swinging movement of bottom plate 7 when pin 27 comes to abut against the bottom of slot 25, the bottom plate will have been accelerated to a relatively great angular velocity, and consequently the upward movement of the grid walls will be quite sudden or jerky ensuring that any toasted bread adhering to a wall will be shaken loose, as mentioned above. For securing the desirable jerky movment of the grid walls is is advantageous to mount the frames 13, 14 with some play within the toaster housing as shown in FIG. 6 in which each frame is supported vertically only at its lower outer edge in channels 34 and 35 in the housing while at their upper ends, they are mounted with a certain horizontal play between inner housing walls 36 and 37 and the downturned portions of top wall 4 defining the aperture 31 therein.

Between the walls 1 and 36, 2 and 37 as well as between the end walls 3 and the outer end covers (not shown) of the housing there may be provided suitable insulating material to keep the outer surfaces of the toaster at a tolerable temperature. In FIG. 6 there is shown a separate bottom member 38 located above bottom plate 7 and pivoting freely on a stationary hinge pin 39 independently of bottom plate 7. Member 38 which during a toasting operation provides a raised supporting surface for the bread in the toasting compartment 32, ensures that also the lowermost bread is subjected to the heat from heating elements 33. The channel member 13' located nearest to front wall 1 may be provided with a plurality of evenly distributed apertures 40 as shown, whereby bread discharged from the toasting compartments, but not immediately removed from the toaster is kept warm under the influence of heat from the associated heating element 33. One of the vertical rods 10 of each grid wall may be supported in elongated apertures in the associated sleeves 12 which allows for free thermal expansion and contraction of the walls in their proper plane.

While the vertically movable compartment walls and the associated actuating mechanism according to the present invention may be incorporated in a toaster provided with a timing device for determining the duration of the toasting period and means for automatically actuating the timer in response to the operation of the cover or lid for the toasting compartment, as described in my previously mentioned U.S. Pat. No. 3,636,858, it will be appreciated that the invention may also be applied to less automated toasters, such as that disclosed in U.S. Pat. No. 1,852,398 in which the timing device is manually started, or even in toasters without any timing device, but with manual tripping of a pawl holding the compartment bottom plate in its raised position during the toasting operation.

What I claim is:

1. A toaster, comprising a housing, two apertured walls extending vertically opposite one another within said housing to define therebetween a vertical toasting compartment, heating means located on the opposite exterior sides of said walls, a toasting compartment bottom wall movably supported within said housing between a first position in which it closes the lower end of said compartment, and a second position in which it permits toasted bread to slide out through the bottom of said compartment, wherein said vertical walls are supported for vertical movement within said housing, and a mechanism is provided which connects said vertical walls with said bottom wall so as to move said vertical walls upwardly when said bottom wall is retracted from its said first position to its said second position.

2. A toaster as claimed in claim 1, in which said compartment bottom wall is pivotally supported in said housing on a horizontal axis parallel to said vertical walls.

3. A toaster as claimed in claim 1, in which said mechanism comprises a tie rod, means supporting said tie rod for vertical movement, means connecting said tie rod with said vertical walls, a coupling means on said bottom wall, and a lost-motion coupling connecting said tie rod with said coupling means, the lost motion of said coupling being slightly smaller than the movement of said coupling means in response to the movement of said bottom wall between its said first and second positions.

4. A toaster as claimed in claim 3, wherein said lost-motion coupling comprises a link pivotally connected with the lower end of said tie rod and having an elongated slot therein, and said coupling means comprises a pin secured to said bottom wall and engaging in said elongated slot.

5. A toaster as claimed in claim 3, wherein a first horizontal slot is provided in said tie rod, and a second horizontal slot is provided in said vertical wall, the means connecting said tie rod with said vertical wall comprises a crankshaft supported for pivotal movement on a horizontal axis and having a first crank engaging in said first horizontal slot and a second crank engaging in said second horizontal slot, said first and second cranks extending in opposite direction relative to said horizontal pivot axis for said crankshaft.

6. A toaster as claimed in claim 1, wherein said vertical compartment side walls are mounted in said housing with play in a direction perpendicular to the plane of each wall.

* * * * *

UNITED STATES PATENT OFFICE
CERTIFICATE OF CORRECTION

Patent No. 3,789,749   Dated February 5, 1974

Inventor(s) Julius B.E. Paaskesen

It is certified that error appears in the above-identified patent and that said Letters Patent are hereby corrected as shown below:

[30]  Foreign Application Priority Data:

August 31, 1971    Denmark.....4264/71

Signed and sealed this 16th day of July 1974.

(SEAL)
Attest:

McCOY M. GIBSON, JR.                C. MARSHALL DANN
Attesting Officer                   Commissioner of Patents